(12) United States Patent
Vihriälä

(10) Patent No.: US 7,062,284 B2
(45) Date of Patent: Jun. 13, 2006

(54) RECEIVER AND RECEPTION METHOD

(75) Inventor: Jaakko Vihriälä, Oulu (FI)

(73) Assignee: Nokia Corporation, Espoo (FI)

( * ) Notice: Subject to any disclaimer, the term of this patent is extended or adjusted under 35 U.S.C. 154(b) by 448 days.

(21) Appl. No.: 10/424,092

(22) Filed: Apr. 28, 2003

(65) Prior Publication Data

US 2003/0186714 A1 Oct. 2, 2003

Related U.S. Application Data

(63) Continuation of application No. PCT/FI01/00942, filed on Oct. 29, 2001.

(30) Foreign Application Priority Data

Oct. 30, 2000 (FI) .................................. 20002391

(51) Int. Cl.
*H04B 17/00* (2006.01)
(52) U.S. Cl. .................. 455/506; 455/226.1
(58) Field of Classification Search ................ 375/144, 375/145, 148, 149, 349; 370/206
See application file for complete search history.

(56) References Cited

U.S. PATENT DOCUMENTS

| | | | |
|---|---|---|---|
| 5,912,919 A | | 6/1999 | Lomp et al. |
| 6,269,075 B1 * | | 7/2001 | Tran ........................... 370/206 |
| 6,757,345 B1 * | | 6/2004 | Heinila ...................... 375/349 |

FOREIGN PATENT DOCUMENTS

| | | |
|---|---|---|
| EP | 0 932 263 A2 | 7/1999 |
| EP | 1 117 186 A1 | 7/2001 |
| EP | 1 134 908 A2 | 9/2001 |
| WO | WO 97/28608 | 8/1997 |
| WO | WO 00/41327 | 7/2000 |
| WO | WO 00/46935 | 8/2000 |

OTHER PUBLICATIONS

"A Non-Coherent Tracking Scheme for the Rake Receiver that can Cope with Unresolvable Multipath" by Volker Aue et al.; pp. 1917-1921; c. Jun. 1999.

* cited by examiner

*Primary Examiner*—Duc Nguyen
*Assistant Examiner*—Justin Lee
(74) *Attorney, Agent, or Firm*—Squire, Sanders & Dempsey, L.L.P.

(57) ABSTRACT

A method for code tracking RAKE receiver fingers, the method comprising: taking several successive samples from a received signal, combining sample values measured in different fingers into measurement value sets, comparing the measurement value sets with each other and selecting the measurement value set having the highest value from among the measurement value sets meeting a minimum delay distance condition for the fingers, if any one of the sample values of the selected measurement value set is earlier than an on-time sample value determined on the basis of code phase acquisition, advancing the sampling or code phase of the particular finger, and if any one of the sample values of the selected measurement value set is later than an on-time sample value determined on the basis of code acquisition, delaying the sampling or code phase of the particular finger.

33 Claims, 5 Drawing Sheets

RECEIVER AND RECEPTION METHOD

This application is a continuation of international application PCT/FI01/00942 filed Oct. 29, 2001 which designated the US and was published under PCT article 21(2) in English.

BACKGROUND OF THE INVENTION

1. Field of the Invention

The invention relates to a receiver and reception method utilizing multipath-propagated signal components of a signal to be received in order to maximize signal energy to be received.

2. Description of the Related Art

In radio systems, such as cellular radio systems, the conditions under which radio waves propagate typically vary continually, which causes variation as a function of time and place, i.e. fading, in a radio signal. Changes occurring in the impulse response of a channel may be caused either by physical changes in the medium (e.g. variation of the refractive index of the medium as a function of temperature, pressure and partial pressure of water vapour) or changes in the geometry of the connection (movement of the transmitter or receiver or obstacle on the connection).

Fast fading of a signal, which is one form of signal fading, is caused by multipath propagation characteristic of the cellular radio environment, wherein the signal propagates via several different routes between a transmitter and a receiver. Such a channel is called Rayleigh fading channel (comprises only multipath-propagated signal components) or Rice fading channel (a received signal also comprises a stable part, i.e. a directly propagated part or a strongly mirror-reflected part).

At the receiver, the multipath-propagated signal components have different phases because of the different propagation paths. A RAKE receiver utilizes these signal components having different phases. Combining the signal components received by different fingers enables the energy of the received signal to be maximized. A RAKE receiver typically comprises several fingers whose delays are set e.g. to correspond with the delays of different signal components measured from the impulse response of the channel. Methods for setting the delays of RAKE receivers are called code phase acquisition or code acquisition methods and code tracking methods. Typically, code acquisition is carried out first, after which code tracking will follow, wherein the delay values set in code phase acquisition are adjusted. A prior art method for RAKE receiver code phase acquisition is disclosed in patent specification FI982856, which is incorporated herein by reference, or in patent specification WO00/41327.

RAKE receivers are used e.g. in a Universal Mobile Telecommunications System (UMTS), which is a wideband data transmission system wherein frequency resources are assigned using a Code Division Multiple Access (CDMA). In a wideband system, a narrowband user data signal is modulated over a relatively wide band by a spreading code that is more wideband than the data signal. In the UMTS system, several users simultaneously transmit over a single frequency channel, and data signals are separated from each other at the receivers on the basis of a pseudo-random spreading code.

A spreading code usually comprises a long pseudo-random bit sequence. The bit rate of the spreading code is much higher than that of a data signal, and in order to distinguish data bits and data symbols from spreading code bits, the latter are called chips. Each user data symbol is multiplied by spreading code chips. The narrowband data signal then spreads over the frequency band used by the spreading code. The spreading code may be one or more data bits long.

In CDMA systems, a RAKE receiver is synchronized with a spreading code sequence signal-component-specifically. Then, in order to carry out code phase acquisition and code tracking, a spreading code generator of the receiver is typically synchronized according to delay values obtained from maximum points of the impulse response. The problem with synchronization, i.e. setting delays, is that code phase acquisition and code tracking take a lot of calculation capacity because of the large number of samples. Furthermore, when the impulse response does not have distinct maximum points but a wide maximum power range, i.e. a 'fat finger' situation, it is difficult to achieve synchronization on the basis of the impulse response determined, according to the prior art, from a signal component received by one finger, and usually some of the energy of the signal to be received is lost.

SUMMARY OF THE INVENTION

An object of the invention is to provide an improved method for setting delays of RAKE receiver fingers, and a receiver whereto the invention can be applied. This is achieved by a method for code tracking RAKE receiver fingers, in which method delay values have been set for the RAKE receiver fingers by using a code phase acquisition method. The method for code tracking comprises taking several successive samples from a received signal, combining sample values measured in different fingers into measurement value sets, comparing the measurement value sets with each other and selecting the measurement value set having the highest value from among the measurement value sets meeting a minimum delay distance condition for the fingers, if any one of the sample values of the selected measurement value set is earlier than an on-time sample value determined on the basis of code phase acquisition, advancing the sampling and/or code phase of the particular finger, if any one of the sample values of the selected measurement value set is later than an on-time sample value determined on the basis of code acquisition, delaying the sampling and/or code phase of the particular finger.

The invention also relates to a method for code tracking RAKE receiver fingers, in which method delay values have been set for the RAKE receiver fingers by using a code phase acquisition method. The method for code tracking comprises taking several successive samples from a received signal, combining sample values measured in different fingers into measurement value sets, comparing the measurement value sets with each other and selecting the measurement value set having the highest value, if any one of the sample values of the selected measurement value set is earlier than an on-time sample value determined on the basis of code phase acquisition, advancing the sampling and/or code phase of the particular finger, ensuring, however, that a minimum delay distance condition for the fingers is met, if any one of the sample values of the selected measurement value set is later than an on-time sample value determined on the basis of code phase acquisition, delaying the sampling and/or code phase of the particular finger, ensuring, however, that a minimum delay distance condition for the fingers is met.

The invention also relates to a receiver implementing the method, the receiver being arranged to code track RAKE receiver fingers when, using a code phase acquisition method, delay values have been set for the RAKE receiver fingers. The receiver comprises means for taking several successive samples from a received signal, the receiver comprises means for combining sample values measured in different fingers into measurement value sets, the receiver comprises means for comparing the measurement value sets with each other and for selecting the measurement value set having the highest value from among the measurement value sets meeting a minimum delay distance condition for the fingers, the receiver comprises means for advancing the sampling and/or code phase of a finger if the sample value of the particular finger belonging to the selected measurement value set is earlier than an on-time sample value determined on the basis of code phase acquisition, the receiver comprises means for delaying the sampling and/or code phase of a finger if the sample value of the particular finger belonging to the selected measurement value set is later than an on-time sample value determined on the basis of code phase acquisition.

The invention also relates to a receiver implementing the method, the receiver being arranged to code track RAKE receiver fingers when, using a code phase acquisition method, delay values have been set for the RAKE receiver fingers. The receiver comprises means for taking several successive samples from a received signal, the receiver comprises means for combining sample values measured in different fingers into measurement value sets, the receiver comprises means for comparing the measurement value sets with each other and for selecting the measurement value set having the highest value, the receiver comprises means for advancing the sampling and/or code phase of a finger if the sample value of the particular finger belonging to the selected measurement value set is earlier than an on-time sample value determined on the basis of code phase acquisition, ensuring, however, that a minimum delay distance condition for the fingers is met, the receiver comprises means for delaying the sampling and/or code phase of a finger if the sample value of the particular finger belonging to the selected measurement value set is later than an on-time sample value determined on the basis of code phase acquisition, ensuring, however, that a minimum delay distance condition for the fingers is met.

Preferred embodiments of the invention are disclosed in dependent claims.

The idea underlying the invention is that the samples, power or amplitude taken in the vicinity of impulse response maximum points in each RAKE finger are combined into different measurement value sets, on the basis of which each RAKE receiver finger is synchronized separately. In the following, the principle of the invention will be described in closer detail by means of an imaginary example: if three samples (early, on-time, late) are taken and if the number of receiver fingers is four, this gives $3^4$, i.e. 81, different measurement value sets. The one of the measurement value sets having the highest value, i.e. the one having the largest amplitude added from the samples, is selected. Next, if in the selected amplitude sample combination the amplitudes of fingers 1 and 2 are late samples and the amplitudes of fingers 3 and 4 early ones, the inaccuracy of timing being greater than or equal to the length of a spreading code chip, the code phases of the fingers 1 and 2 are delayed while the code phases of the fingers 3 and 4 are advanced, retaining, however, a minimum delay distance between the fingers in order not to lose diversity gain. The above example in no way restricts the application of the invention but has only been shown to illustrate the invention.

The method and system of the invention provide several advantages. Delays of the RAKE receiver fingers become quicker to set and calculation capacity will be saved since only a few, e.g. three, samples are used for determining the impulse response of a channel. In addition, if the impulse response does not comprise clear maximum points but a wide maximum power range, using an impulse response measurement result set determined on the basis of multipath-propagated signal components received by several fingers enables the RAKE fingers to be synchronized in a more optimal manner, i.e. signal energy received from the radio channel can be maximized. The method further comprises keeping the delays of different fingers at least at a minimum delay distance from each other, in which case the diversity gain will not be lost.

BRIEF DESCRIPTION OF THE DRAWINGS

The invention is now described in closer detail in connection with the preferred embodiments and with reference to the accompanying drawings, in which.

DETAILED DESCRIPTION OF THE PREFERRED EMBODIMENTS

The following example describes preferred embodiments of the invention in a UMTS (Universal Mobile Telecommunications Systems) system without, however, restricting the invention thereto.

Figure 1:
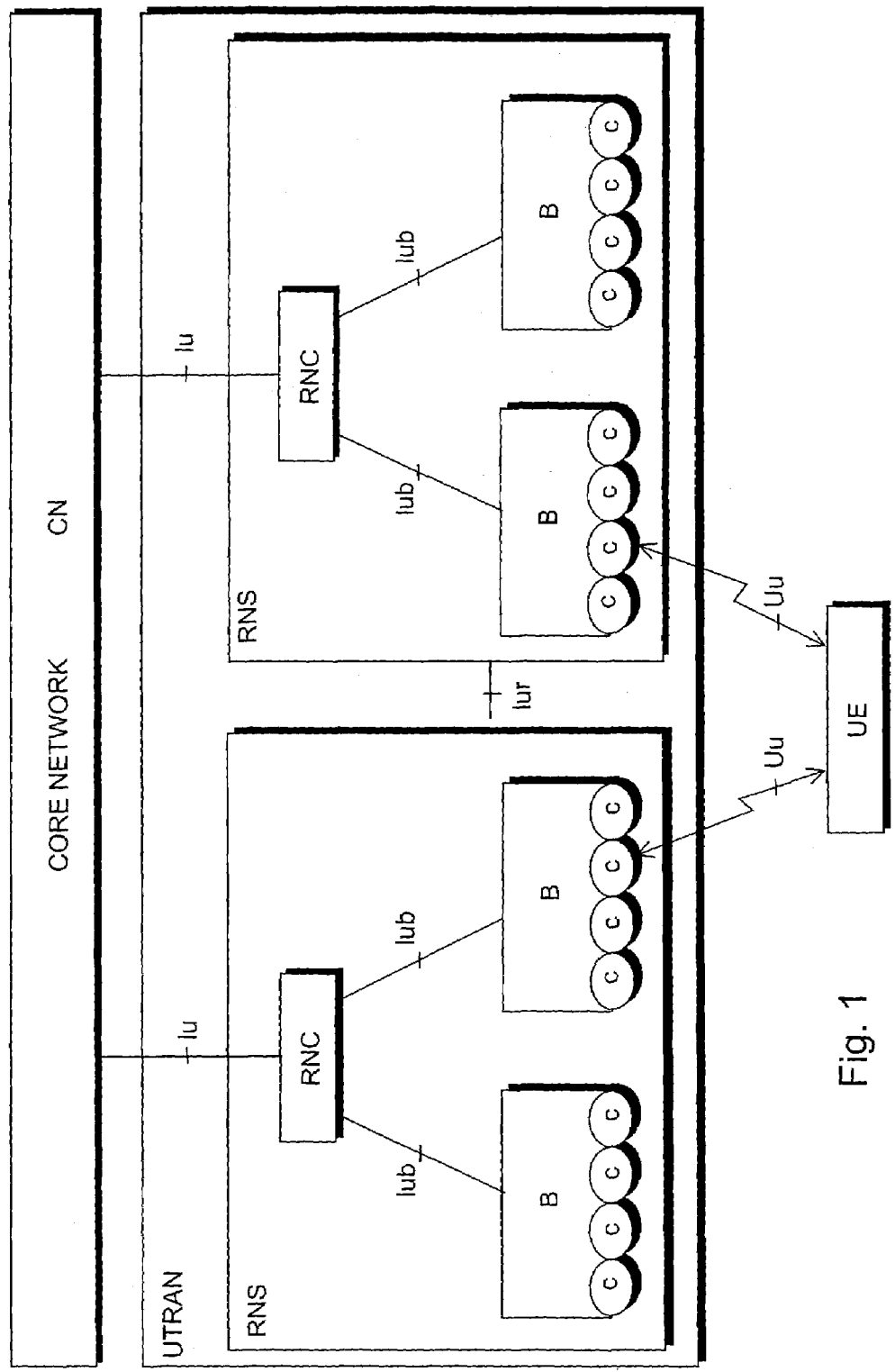
FIG. 1 shows an example of a telecommunication system.

Referring to FIG. 1, the structure of a mobile telephone system will be described by way of example. The main parts of the mobile telephone system are a core network (CN), UMTS Terrestrial Radio Access Network (UTRAN) and user equipment (UE). The interface between the CN and the UTRAN is called Iu, and the air interface between the UTRAN and the UE is called Uu.

The UTRAN comprises radio network subsystems (RNS). The interface between RNSs is called Iur. An RNS comprises a radio network controller (RNC) and one or more nodes B (B). The interface between the RNC and a B is called Iub. In the figure, C designates the coverage area, i.e. cell, of node B.

Figure 2:
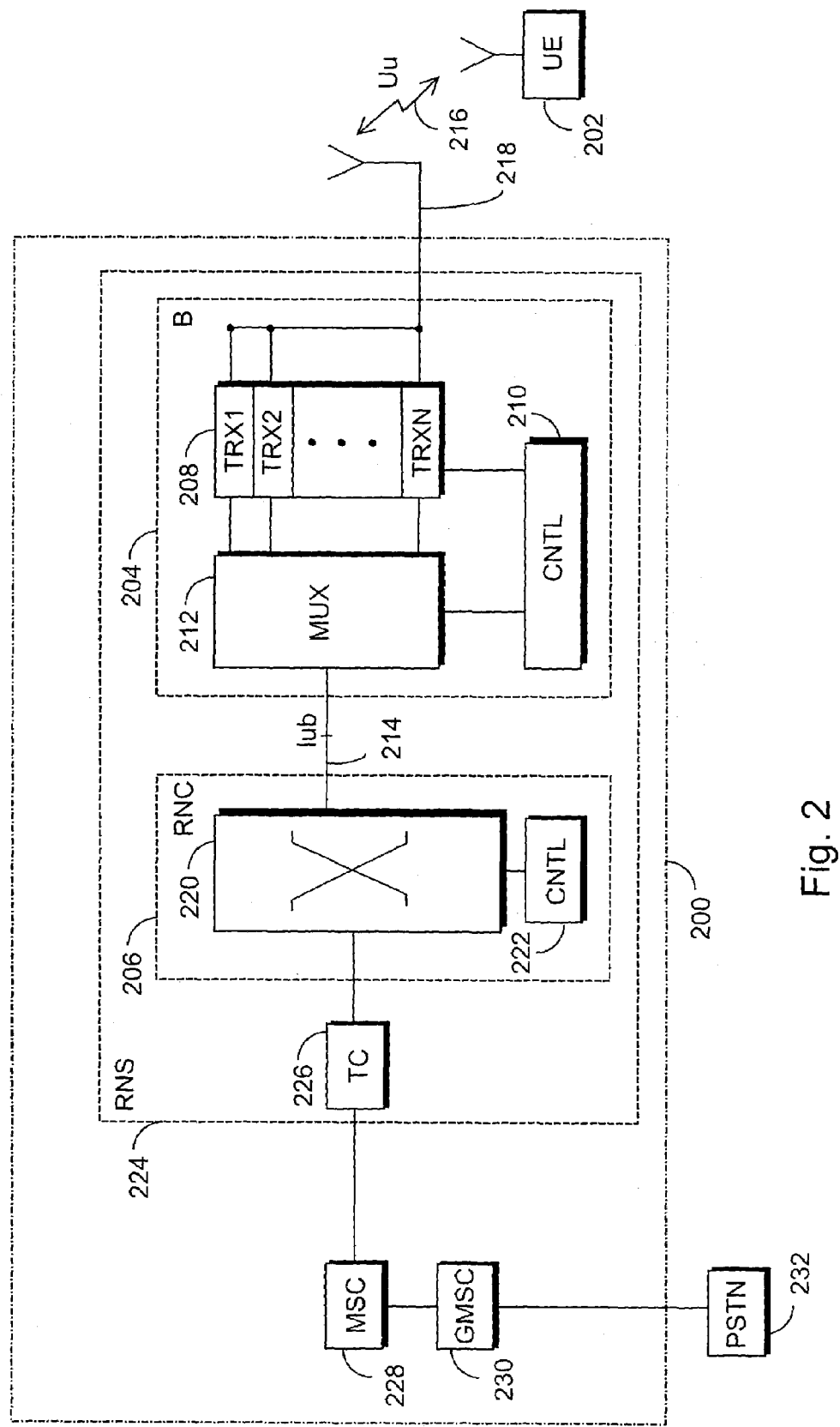
FIG. 2 shows a second example of a telecommunication system.

The description shown in FIG. 1 is quite a general one, so FIG. 2 shows a more detailed example of a cellular radio system. FIG. 2 only comprises the most relevant blocks, but it will be obvious to one skilled in the art that a conventional cellular radio network also comprises other functions and structures, which need not be described in closer detail herein. The details of a cellular radio system may differ from those disclosed in FIG. 2; such differences are, however, irrelevant to the invention.

Typically, a cellular radio network thus comprises a fixed network infrastructure, i.e. a network part 200, user equipment 202, which can be fixedly located, positioned in a vehicle or portable terminals to be carried around, such as mobile telephones or portable computers enabling communication with a radio telecommunication system. The network part 200 comprises base transceiver stations 204. A base transceiver station corresponds to node B in the previous figure. Several base transceiver stations, in turn, are controlled in a centralized manner by a radio network controller 206 connected thereto. The base transceiver station 204 comprises transceivers 208 and a multiplexer unit 212.

The base transceiver station 204 further comprises a control unit 210, which controls the operation of the transceivers 208 and the multiplexer 212. The multiplexer 212 is used for placing the traffic and control channels used by several transceivers 208 in a single transmission connection 214. The transmission connection 214 constitutes the interface Iub.

The transceivers 208 of the base transceiver station 204 are connected to an antenna unit 218 for implementing a bidirectional radio connection 216 to the user equipment 202. The structure of frames transmitted in the bidirectional radio connection 216 is specified system-specifically, and it is called an air interface Uu.

The radio network controller 206 comprises a group switching field 220 and a control unit 222. The group switching field 220 is used for switching speech and data and for combining signalling circuits. The radio network subsystem 224 comprising the base transceiver station 204 and the radio network controller 206 further comprises a transcoder 226. The transcoder 226 is usually located as close to a mobile services switching centre 228 as possible since speech can thus be transmitted in the cellular radio network mode between the transcoder 226 and the radio network controller 206 using as little transmission capacity as possible.

The transcoder 226 converts the different digital speech encoding modes used between a public switched telephone network and a radio telephone network into compatible ones, e.g. from the mode of the fixed network into another mode of the cellular radio network, and vice versa. The control unit 222 performs call control, mobility management, collection of statistical data and signalling.

FIG. 2 further shows the mobile services switching centre 228 and a gateway mobile services switching centre 230, which is responsible for connections of the mobile telephone system to the external world, in this case to a public switched telephone network 232.

Figure 3:
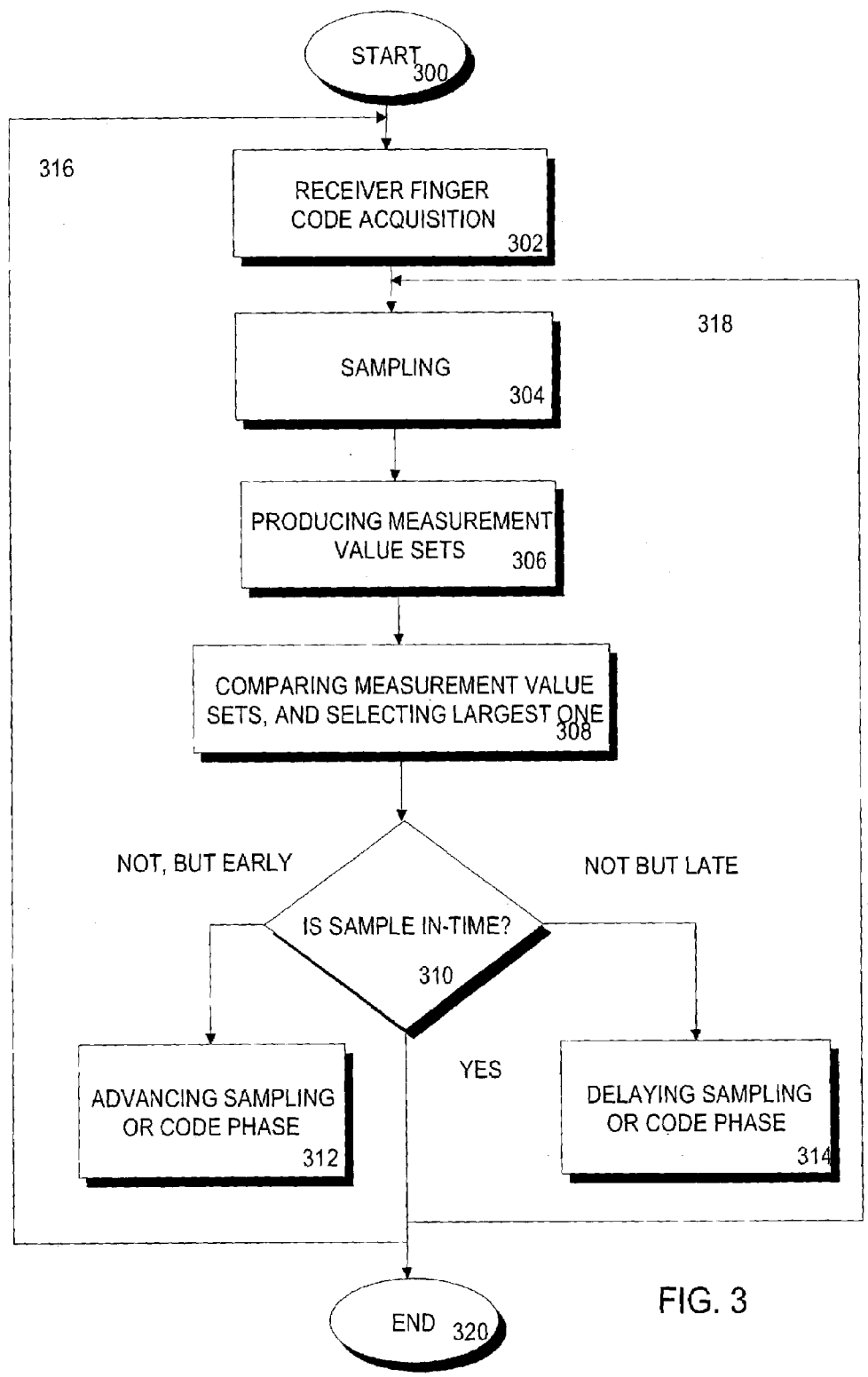
FIG. 3 is a flow diagram showing method steps for code tracking.

The flow diagram of FIG. 3 shows method steps for code tracking. The method starts in block 300. In block 302, RAKE receiver fingers are code tracked using a prior art method, preferably by determining the highest values of the impulse response of a received signal at an accuracy allowed by the selected method.

In block 304, several successive samples are taken from the received signal, preferably in the vicinity of the highest values of the impulse response of each finger. Preferably, the samples are amplitude values or power values. The samples can be taken e.g. at intervals of a sample time or a multiple thereof. The number of samples may vary according to the application. However, the same number of samples is taken in all receiver fingers so that a subsequent comparison gives a correct result. If the receiver fingers are to be weighted differently, a different number of samples can, however, be taken from different fingers. A possible number of samples is three, in which case one sample is taken at a point in time at which, on the basis of code acquisition, the maximum point of the impulse response is assumed to be. This sample is herein called an on-time sample. A second sample is taken e.g. one sampling moment earlier, and this sample is herein called an early sample. A third sample is taken e.g. one sampling moment later, and this sample is herein called a late sample. The difference between the sampling moments of successive samples may also be greater than one sampling moment, in which case the missing samples are obtained by interpolating.

In block 306, the sample values measured in different fingers are combined into measurement value sets. Preferably, all possible sample value combinations are produced. In the above case containing three samples and four receiver fingers, an illustrative example of measurement value sets includes the following measurement value sets: early sample (first finger), early sample (second finger), on-time sample (third finger) and late sample (fourth finger), or late sample (first finger), early sample (second finger), late sample (third finger) and on-time sample (fourth sample). The different sample values are preferably combined by adding, but another combination method may also be used.

In block 308, the measurement value sets are compared with each other, i.e. for instance the sum amplitudes or sum powers of different measurement value sets calculated in block 306 are compared. As a result, the set having the highest value, i.e. for instance the set having the largest sum amplitude or sum power, is selected from among the measurement value sets. According to a second embodiment, the set having the highest value is selected from among the measurement value sets meeting a minimum delay distance condition for the fingers. A minimum delay distance refers to the smallest delay difference between different fingers by which the different fingers synchronize with different signal components, and it can be set appropriately in each application.

Block 310 describes a selection to be made as a result of the comparison on the basis of the elementary units of a selected measurement value set, i.e. the sampling moment of different samples. If a sample is earlier than an on-time sample determined on the basis of code acquisition, the sampling or code phase of the particular finger is advanced for the next sample, block 312. If, on the other hand, a sample is later than an on-time sample determined on the basis of code acquisition, the sampling or code phase of the particular finger is delayed for the next sample, block 314. If the minimum delay distance condition is not met in the selected measurement value set, the sampling moment or code phase is changed only within the limits defined by the minimum delay condition.

If the sampling moment deviates from the on-time sampling moment determined on the basis of code acquisition by less than the duration of one spreading code bit, i.e. chip, the sampling moment is moved. If, on the other hand, the sampling moment deviates from the on-time sampling moment determined on the basis of code acquisition at least as much as the duration of one spreading code bit, i.e. chip, the code phase of a code generator is moved.

Next, an example of synchronizing a sampling moment or a code phase will be described. If, in a selected measurement set, which can be e.g. a combination of amplitude samples, the amplitudes of the fingers 1 and 2 are late samples and the amplitude of the finger 3 is an early one, the inaccuracy of timing being greater than or equal to the length of a spreading code chip, the code phases of the fingers 1 and 2 are delayed while the code phase of the finger 3 is advanced. While adjusting the delays of the fingers, it should, however, be remembered that the minimum delay distance between the fingers is to be retained in order not to lose diversity gain.

Arrow 316 describes how the method can be repeated starting from code acquisition. The code acquisition and impulse response estimation possibly required for the code acquisition can be repeated e.g. at certain intervals or when the quality of a received signal deteriorates too much.

Arrow 318 describes the repeatability of the code tracking method. Code tracking enables the interval at which code acquisition is repeated to be extended.

The method ends in block 320.

Figure 4:
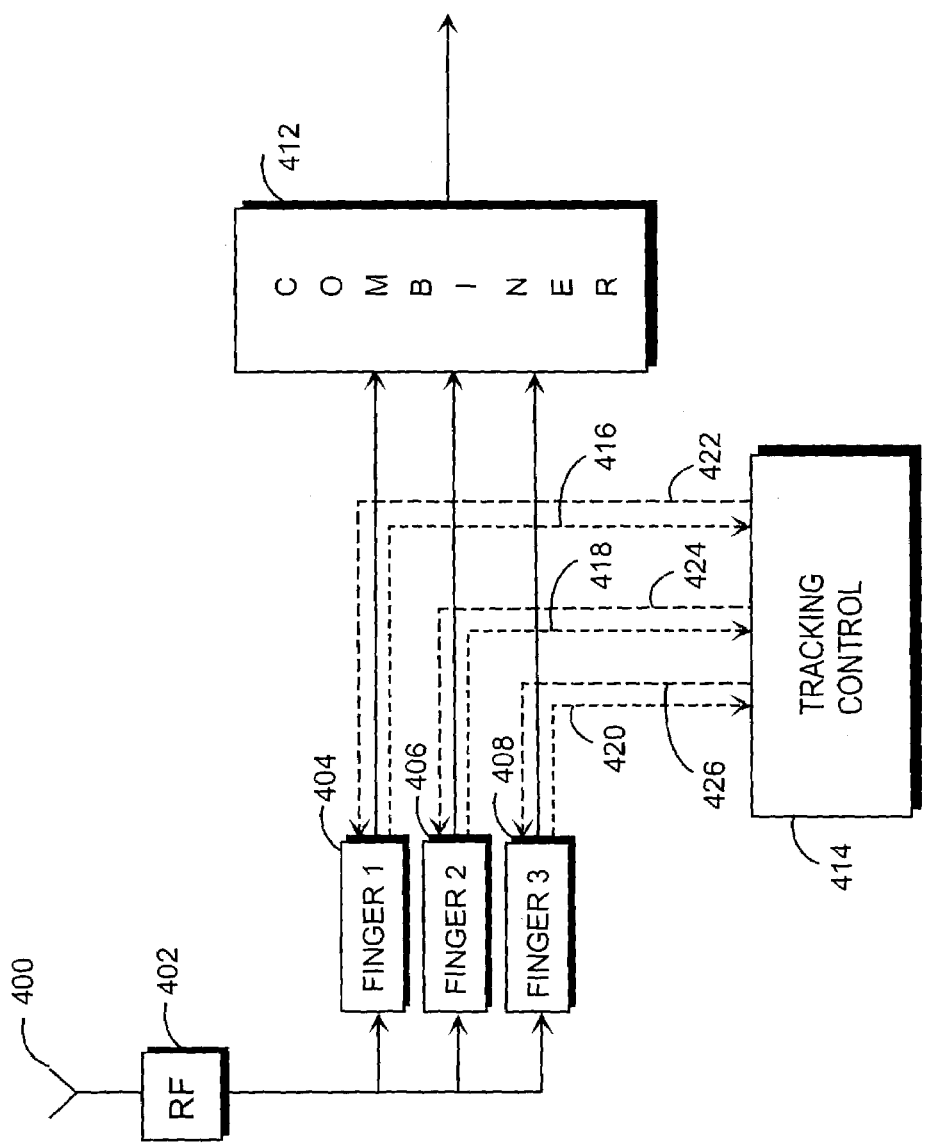
FIG. 4 shows an example of a RAKE receiver, FIG. 5 an example of the structure of a RAKE finger for code tracking.

FIG. 4 illustrates a RAKE receiver code tracking part by way of example. The RAKE receiver described in the example comprises three correlator fingers 404, 406 and 408. The number of fingers may differ from the shown one. Each signal component differently delayed, received by an antenna or an antenna array 400, filtered in radio frequency parts 402 and downconverted to baseband is supplied to a receiver finger of its own. The described receiver also comprises a diversity combiner 412, which combines the differently delayed signal components of different fingers. In the exemplary solution of the figure, a control unit 414 comprises a code tracking facility for controlling code delays or sampling moments.

Signals 416, 418 and 420 deliver the samples taken in each finger to the control unit. If necessary, signals 422, 424 and 426 deliver a code tracking control signal to each finger for controlling the code delays or sampling moments.

Next, an example of the structure of a RAKE finger for code tracking will be described by means of FIG. 5. The receiver is a spread-spectrum receiver for receiving a DS (Direct Sequence) signal, i.e. a direct-spread signal.

In the receiver finger of the disclosed example, three samples are taken from a signal component. It is to be noted, however, that the number of samples may differ from the shown one. A complex, broadband signal, which is typically baseband and which is preferably decimated by taking one sample from each chip, is supplied to sampling means 508, 510 and 512. On the basis of code phase acquisition, the sampling means 510 is assumed to be on-time, i.e. a sampling moment has been determined for the sampling means 510 such that sampling takes place at a point in time which, on the basis of code phase acquisition, has been determined as a probable time of occurrence of one of the highest values of the impulse response. The sampling moment of the sampling means 508 is preferably delayed by one sampling moment in comparison to the sampling moment of the sampling means 510, and the sampling moment of the sampling means 512 is preferably advanced by one sampling moment in comparison to the sampling moment of the sampling means 510. This gives three samples, which are herein called early, on-time and late samples.

In order to despread a narrowband signal from the received signal, the sampled signals are multiplied by a spreading code sequence generated by a code generator 500. For each sample, early, on-time or late one, the spreading code delay can be determined separately. The example of FIG. 5 also shows integrate-and-dump filters 524, 526 and 528, in which the signal is integrated over a certain moment, e.g. a symbol time, the result is outputted and the integrator reset to zero, and the integration is restarted. The filters 524, 526 and 528 can also be implemented using low-pass filters.

Figure 5:
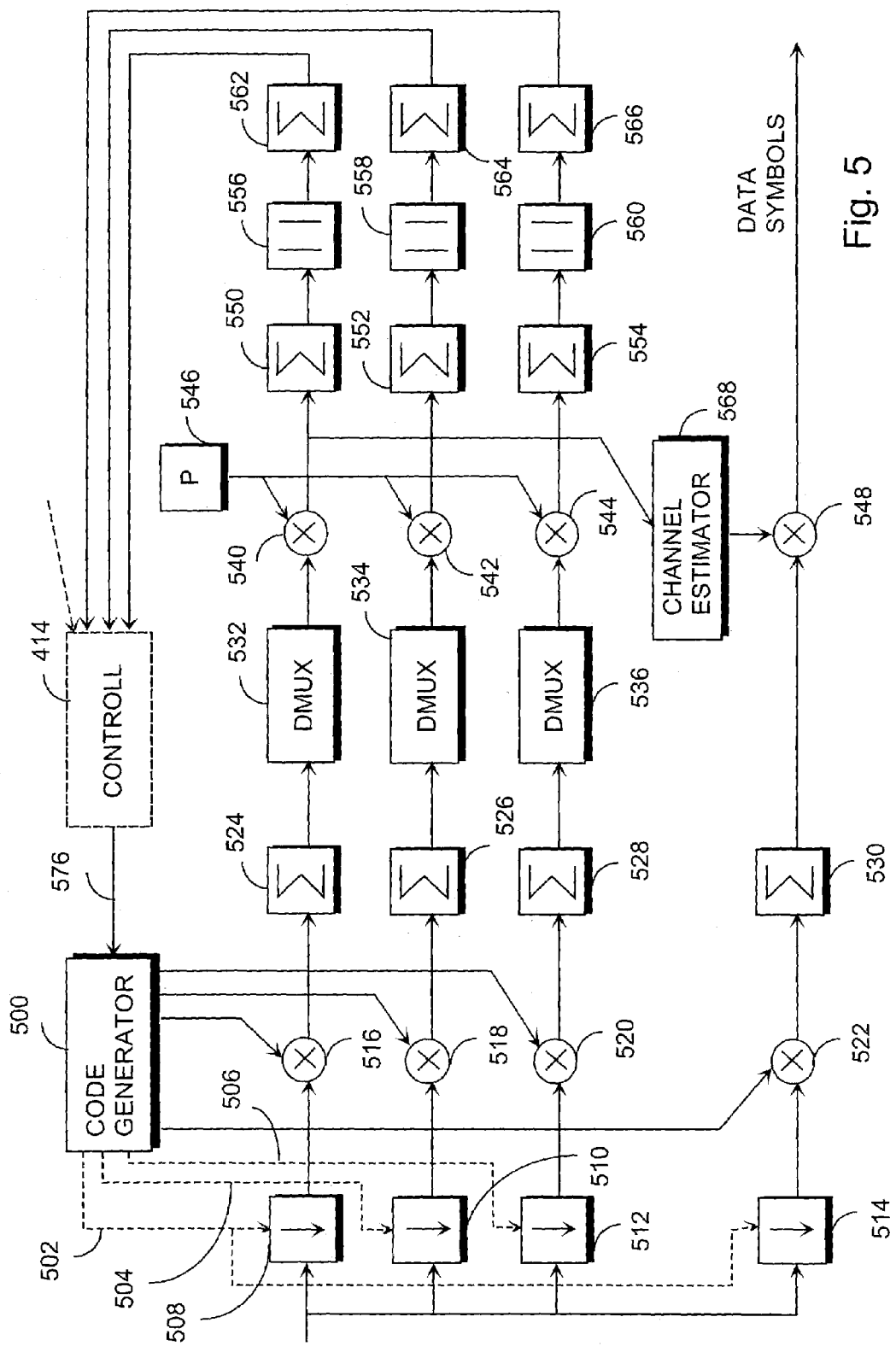

Next, in the solution disclosed in FIG. 5, pilot symbols are separated from the signals by demultiplexers 532, 534 and 536. Next, the pilot symbols are multiplied in multipliers 540, 542 and 544 by complex conjugates of the pilot symbols that are formed in block 546, and integrated in blocks 550, 552 and 554 by the number of time-slot-specific pilot symbols, i.e. the pilot symbols are filtered by a matched filter in order to determine the multi-path delay profile of a radio channel. The multi-path delay profile can also be averaged. Envelope detectors 556, 558 and 560 are used for determining the amplitude or power of the complex signal. Instead of an envelope detector, a square-law detector can be used.

In blocks 562, 564 and 566, integration is carried out in order to remove noise. The three samples obtained, i.e. the early, on-time and late samples, are supplied to the control unit 414, which is responsible for combining the samples acquired from all receiver fingers, in the example of FIG. 5, the amplitude values or power values of the samples determined by the envelope detector or square-law detector, into different measurement value sets, for comparing these sets and for selecting the largest one and, on the basis of this, for giving synchronization commands to the different receiver fingers. For instance, assume that three samples are taken and the number of receiver fingers is also three, as in the example of the figure. This gives $3^3$, i.e. 27, different measurement value sets. The one of the measurement value sets having the highest value, i.e. the one having the largest amplitude added from the samples, is selected. If in the selected amplitude sample combination the amplitudes of the fingers 1 and 2 are late samples and the amplitude of the finger 3 is an early one, the inaccuracy of timing being greater than or equal to the length of the spreading code chip, the code phases of the fingers 1 and 2 are delayed while the code phase of the finger 3 is advanced. While adjusting the delays of the fingers, it is, however, to be remembered that the minimum delay distance between the fingers is to be retained in order not to lose diversity gain.

According to the second embodiment, the largest measurement value set is selected from the measurement value sets meeting the minimum delay distance condition.

A channel estimator 568 estimates the quality of the radio channel by means of pilot symbols. A state estimate is used for removing symbol phase rotation caused by the radio channel from data symbols.

A sampling means 514 is used for sampling a data signal. Also the data signal is wideband, so it is composed by means 522 and 530. The data symbols are multiplied by the channel state estimate in a multiplier 548, after which the data bits are conveyed to decoding means, which, not being expressly relevant to the invention, are not shown in the figure.

It is to be noted that the described code tracking method can also be applied without using a pilot signal such that the information necessary for synchronizing the sampling moment or code phase is obtained by processing the data signal in a manner corresponding to that in connection with the pilot signal above.

The above-described functional blocks of the user equipment, such as the code tracking control unit, can be implemented in many ways, e.g. by software executed by a processor or by hardware implementation, such as a logic built using separate components or an ASIC (Application Specific Integrated Circuit).

Although the invention has been described above with reference to the example according to the accompanying drawings, it is obvious that the invention is not restricted thereto but can be modified in many ways within the scope of the inventive idea disclosed in the attached claims.

I claim:

1. A method for code tracking RAKE receiver fingers, in which method delay values have been set for the RAKE receiver fingers by using a code phase acquisition method, the method for code tracking comprising taking several successive samples from a received signal,
combining sample values measured in different fingers into measurement value sets, comparing the measurement value sets with each other and selecting the measurement value set having the highest value from among the measurement value sets meeting a minimum delay distance condition for the fingers, if any one of the sample values of the selected measurement value set is earlier than an on-time sample value determined on the basis of code phase acquisition, advancing the sampling or code phase of the particular finger, if any one of the sample values of the selected measurement value set is later than an on-time sample value determined on the basis of code phase acquisition, delaying the sampling or code phase of the particular finger.

2. A method for code tracking RAKE receiver fingers, in which method delay values have been set for the RAKE receiver fingers by using a code phase acquisition method, the method for code tracking comprising taking several successive samples from a received signal, combining sample values measured in different fingers into measurement value sets, comparing the measurement value sets with each other and selecting the measurement value set having the highest value from among the measurement value sets meeting a minimum delay distance condition for the fingers, if any one of the sample values of the selected measurement value set is earlier than an on-time sample value determined on the basis of code phase acquisition, advancing the sampling and code phase of the particular finger, if any one of the sample values of the selected measurement value set is later than an on-time sample value determined on the basis of code phase acquisition, delaying the sampling and code phase of the particular finger.

3. A method for code tracking RAKE receiver fingers, in which method delay values have been set for the RAKE receiver fingers by using a code phase acquisition method, the method for code tracking comprising taking several successive samples from a received signal, combining sample values measured in different fingers into measurement value sets, comparing the measurement value sets with each other and selecting the measurement value set having the highest value, if any one of the sample values of the selected measurement value set is earlier than an on-time sample value determined on the basis of code phase acquisition, advancing the sampling or code phase of the particular finger, ensuring, however, that a minimum delay distance condition for the fingers is met, if any one of the sample values of the selected measurement value set is later than an on-time sample value determined on the basis of code phase acquisition, delaying the sampling or code phase of the particular finger, ensuring, however, that the minimum delay distance condition for the fingers is met.

4. A method for code tracking RAKE receiver fingers, in which method delay values have been set for the RAKE receiver fingers by using a code phase acquisition method, the method for code tracking comprising taking several successive samples from a received signal, combining sample values measured in different fingers into measurement value sets, comparing the measurement value sets with each other and selecting the measurement value set having the highest value, if any one of the sample values of the selected measurement value set is earlier than an on-time sample value determined on the basis of code phase acquisition, advancing the sampling and code phase of the particular finger, ensuring, however, that a minimum delay distance condition for the fingers is met, if any one of the sample values of the selected measurement value set is later than an on-time sample value determined on the basis of code phase acquisition, delaying the sampling and code phase of the particular finger, ensuring, however, that the minimum delay distance condition for the fingers is met.

5. The method as claimed in claim 1, wherein the sample values are impulse response amplitude values.

6. The method as claimed in claim 1, wherein the sample values are impulse response power values.

7. The method as claimed in claim 1, wherein three successive samples are taken, the samples being early, on-time and late ones.

8. The method as claimed in claim 1, wherein the sample values measured in different fingers are combined into measurement value sets by adding the sample values.

9. The method as claimed in claim 1, further comprising: if a sampling moment deviation from an on-time sampling moment determined on the basis of code phase acquisition is less than the duration of one spreading code bit, the sampling moment is moved.

10. The method as claimed in claim 1, further comprising: if a sampling moment deviation from an on-time sampling moment determined on the basis of code phase acquisition is more than or equal to the duration of one spreading code bit, the delay of a code generator of a receiver is changed.

11. A computer program, embodied on a computer readable medium, configured to perform the method steps as claimed in claim 1.

12. The method of claim 1, said method being implemented in a computer program stored on a computer memory device.

13. A receiver arranged to code track RAKE receiver fingers when, using a code phase acquisition method, delay values have been set for the RAKE receiver fingers, the receiver comprising means for taking several successive samples from a received signal, means for combining sample values measured in different fingers into measurement value sets, means for comparing the measurement value sets with each other and for selecting the measurement value set having the highest value from among the measurement value sets meeting a minimum delay distance condition for the fingers, means for advancing the sampling of a finger if the sample value of the particular finger belonging to the selected measurement value set is earlier than an on-time sample value determined on the basis of code phase acquisition, means for advancing code phase of a finger if the sample value of the particular finger belonging to the selected measurement value set is earlier than an on-time sample value determined on the basis of code phase acquisition, means for delaying the sampling of a finger if the sample value of the particular finger belonging to the selected measurement value set is later than an on-time sample value determined on the basis of code phase acquisition, means for delaying code phase of a finger if the sample value of the particular finger belonging to the selected measurement value set is later than an on-time sample value determined on the basis of code phase acquisition.

14. A receiver arranged to code track RAKE receiver fingers when, using a code phase acquisition method, delay values have been set for the RAKE receiver fingers, the receiver comprising means for taking several successive samples from a received signal, means for combining sample values measured in different fingers into measurement value sets, means for comparing the measurement value sets with each other and for selecting the measurement value set having the highest value, means for advancing the sampling of a finger if the sample value of the particular finger belonging to the selected measurement value set is earlier than an on-time sample value determined on the basis of code phase acquisition, ensuring, however, that a minimum delay distance condition for the fingers is met, means for advancing code phase of a finger if the sample value of the particular finger belonging to the selected measurement value set is earlier than an on-time sample value determined on the basis of code phase acquisition, ensuring, however, that a minimum delay distance condition for the fingers is met, means for delaying the sampling of a finger if the sample value of the particular finger belonging to the selected measurement value set is later than an on-time sample value determined on the basis of code phase acquisition, ensuring, however, that a minimum delay distance condition for the fingers is met, means for delaying code phase of a finger if the sample value of the particular finger belonging to the selected measurement value set is later than an on-time sample value determined on the basis of code phase acquisition, ensuring, however, that a minimum delay distance condition for the fingers is met.

15. The receiver as claimed in claim 14, wherein the sample values are impulse response amplitude values.

16. The receiver as claimed in claim 14, wherein the sample values are impulse response power values.

17. The receiver as claimed in claim 14, further comprising means for taking three successive samples, the samples being early, on-time and late ones.

18. The receiver as claimed in claim 14, further comprising means for measuring the sample values in different fingers are combined into measurement value sets by adding the sample values.

19. The receiver as claimed in claim 14, further comprising: if a sampling moment deviation from an on-time sampling moment determined on the basis of code phase acquisition is less than the duration of one spreading code bit, the sampling moment is moved.

20. The receiver as claimed in claim 14, further comprising: if a sampling moment deviation from an on-time sampling moment determined on the basis of code phase acquisition is more than or equal to the duration of one spreading code bit, the delay of a code generator of the receiver moment is changed.

21. A user terminal, operating in a communications network, arranged to code track RAKE receiver fingers when, using a code phase acquisition method, delay values have been set for the RAKE receiver fingers, the user terminal comprising:

means for taking several successive samples from a received signal, means for combining sample values measured in different fingers into measurement value sets, means for comparing the measurement value sets with each other and for selecting the measurement value set having the highest value, means for advancing the sampling of a finger if the sample value of the particular finger belonging to the selected measurement value set is earlier than an on-time sample value determined on the basis of code phase acquisition, ensuring, however, that a minimum delay distance condition for the fingers is met, means for advancing code phase of a finger if the sample value of the particular finger belonging to the selected measurement value set is earlier than an on-time sample value determined on the basis of code phase acquisition, ensuring, however, that a minimum delay distance condition for the fingers is met, means for delaying the sampling of a finger if the sample value of the particular finger belonging to the selected measurement value set is later than an on-time sample value determined on the basis of code phase acquisition, ensuring, however, that a minimum delay distance condition for the fingers is met, means for delaying code phase of a finger if the sample value of the particular finger belonging to the selected measurement value set is later than an on-time sample value determined on the basis of code phase acquisition, ensuring, however, that a minimum delay distance condition for the fingers is met.

22. The user terminal as claimed in claim 21, wherein the user terminal comprises a mobile phone.

23. A network element, operating in a communications network, arranged to code track RAKE receiver fingers when, using a code phase acquisition method, delay values have been set for the RAKE receiver fingers, the network element comprising:

means for taking several successive samples from a received signal, means for combining sample values measured in different fingers into measurement value sets, means for comparing the measurement value sets with each other and for selecting the measurement value set having the highest value, means for advancing the sampling of a finger if the sample value of the particular finger belonging to the selected measurement value set is earlier than an on-time sample value determined on the basis of code phase acquisition, ensuring, however, that a minimum delay distance condition for the fingers is met, means for advancing code phase of a finger if the sample value of the particular finger belonging to the selected measurement value set is earlier than an on-time sample value determined on the basis of code phase acquisition, ensuring, however, that a minimum delay distance condition for the fingers is met, means for delaying the sampling of a finger if the sample value of the particular finger belonging to the selected measurement value set is later than an on-time sample value determined on the basis of code phase acquisition, ensuring, however, that a minimum delay distance condition for the fingers is met, means for delaying code phase of a finger if the sample value of the particular finger belonging to the selected measurement value set is later than an on-time sample value determined on the basis of code phase acquisition, ensuring, however, that a minimum delay distance condition for the fingers is met.

24. The network element as claimed in claim 23, wherein the network element comprises a base station.

25. A system comprising:
a network;
a base station operably connected to the network; and
a network device operably connected to the base station via the network;
wherein the base station and the network device each have a receiver and are arranged to code track RAKE receiver fingers when, using a code phase acquisition method, delay values have been set for the RAKE receiver fingers, the receiver comprising;
means for taking several successive samples from a received signal,
means for combining sample values measured in different fingers into measurement value sets,
means for comparing the measurement value sets with each other and for selecting the measurement value set having the highest value,
means for advancing the sampling of a finger if the sample value of the particular finger belonging to the selected measurement value set is earlier than an on-time sample value determined on the basis of code phase acquisition, ensuring, however, that a minimum delay distance condition for the fingers is met,
means for advancing code phase of a finger if the sample value of the particular finger belonging to the selected measurement value set is earlier than an on-time sample value determined on the basis of code phase acquisition, ensuring, however, that a minimum delay distance condition for the fingers is met,
means for delaying the sampling of a finger if the sample value of the particular finger belonging to the selected measurement value set is later than an on-time sample value determined on the basis of code phase acquisition, ensuring, however, that a minimum delay distance condition for the fingers is met,
means for delaying code phase of a finger if the sample value of the particular finger belonging to the selected measurement value set is later than an on-time sample value determined on the basis of code phase acquisition, ensuring, however, that a minimum delay distance condition for the fingers is met.

26. The method as claimed in claim 2, wherein the method further comprises:
providing a mobile phone; and
performing the method steps by the mobile phone.

27. The method as claimed in claim 3, wherein the method further comprises:
providing a mobile phone; and
performing the method steps by the mobile phone.

28. The method as claimed in claim 4, wherein the method further comprises:
providing a mobile phone; and
performing the method steps by the mobile phone.

29. The method as claimed in claim 2, wherein the method further comprises:
providing a base station; and
performing the method steps by the base station.

30. The method as claimed in claim 3, wherein the method further comprises:
providing a base station; and
performing the method steps by the base station.

31. The method as claimed in claim 4, wherein the method further comprises:
providing a base station; and
performing the method steps by the base station.

32. The receiver as claimed in claim 13, wherein the receiver comprises a mobile phone.

33. The receiver as claimed in claim 13, wherein the receiver comprises a base station.

* * * * *